(12) United States Patent
Wang et al.

(10) Patent No.: US 10,670,539 B1
(45) Date of Patent: Jun. 2, 2020

(54) COATING QUALITY INSPECTION SYSTEM AND METHOD

(71) Applicant: General Electric Company, Schenectady, NY (US)

(72) Inventors: Guanghua Wang, Clifton Park, NY (US); Margeaux Wallace, Niskayuna, NY (US); Bernard Patrick Bewlay, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 13 days.

(21) Appl. No.: 16/216,527

(22) Filed: Dec. 11, 2018

(51) Int. Cl.
*G01N 21/95* (2006.01)
*G01N 21/956* (2006.01)
*G01N 21/88* (2006.01)
*G06T 7/00* (2017.01)

(52) U.S. Cl.
CPC ... *G01N 21/95607* (2013.01); *G01N 21/8806* (2013.01); *G06T 7/001* (2013.01); *G06T 2207/30156* (2013.01)

(58) Field of Classification Search
CPC .......... G01N 21/95607; G01N 21/8806; G06T 7/001
See application file for complete search history.

(56) References Cited

U.S. PATENT DOCUMENTS

| | | | |
|---|---|---|---|
| 6,394,646 B1 | 5/2002 | Ringermacher et al. | |
| 8,244,488 B2 | 8/2012 | Allen et al. | |
| 10,473,593 B1* | 11/2019 | Xiong | G01N 21/8851 |
| 2005/0247877 A1* | 11/2005 | Mackin | C23C 14/547 |
| | | | 250/341.1 |
| 2018/0270465 A1 | 9/2018 | Bendall | |

* cited by examiner

*Primary Examiner* — Hugh Maupin
(74) *Attorney, Agent, or Firm* — The Small Patent Law Group LLC; Philip S. Hof

(57) ABSTRACT

An inspection system includes a light source, an imaging device, and one or more processors. The light source is configured to direct an illumination light having a controlled light characteristic towards a surface of a thermal barrier coating of a work piece. The imaging device is configured to capture image data of the surface of the thermal barrier coating by monitoring the illumination light reflected off the surface. The one or more processors are operably connected to the imaging device and configured to analyze the image data of the surface by comparing the image data to reference image data depicting a first designated microstructure. The first designated microstructure has an associated coating quality value. The one or more processors are configured to determine that the thermal barrier coating of the work piece has the first designated microstructure based on the analysis.

21 Claims, 7 Drawing Sheets

COATING QUALITY INSPECTION SYSTEM AND METHOD

FIELD

The subject matter described herein relates to inspection of work pieces having surface coatings.

BACKGROUND

Various types of work pieces utilized in vehicle and industrial applications have coatings to protect the underlying base materials from heat, corrosion, impacts, and the like. For example, some metal components of gas turbine engines that are exposed to high temperatures during operation, such as rotor blades, combustor liners, nozzles, shafts, pistons and the like, have thermal barrier coatings that provide thermal protection. The thermal barrier coatings include heat-resistant materials, such as ceramics.

The quality of the thermal barrier coating on a work piece impacts the operational lifespan of the work piece. Work pieces having higher quality thermal barrier coatings have longer operational lifespans than work pieces having lower quality thermal barrier coatings because the lower quality thermal barrier coatings may deteriorate more readily than the higher quality thermal barrier coatings. Variations in thermal barrier coating quality may be attributable to uncontrolled differences during a generally constant coating application process, such as slight changes in environmental conditions. Therefore, the same coating application process may produce thermal barrier coatings of different quality, but it is not known which of the work pieces have higher quality coatings and which of the work pieces have lower quality coatings. As a result, work pieces having higher quality coatings may be installed into the same machine, such as an engine, with work pieces having lower quality coatings. As described above, the lower quality coatings deteriorate quicker than the higher quality coatings. At the end of the lifespan of the work pieces having the lower quality coatings, an operator may disassemble the machine and replace all of the work pieces (e.g., all of the rotor blades of a rotor assembly) at the same time. This practice is inefficient and costly because it results in the premature disposal of work pieces that still have significant lifespan remaining attributable to higher quality thermal barrier coatings.

SUMMARY

In one or more embodiments, an inspection system is provided that includes a light source, an imaging device, and one or more processors. The light source is configured to direct an illumination light having a controlled light characteristic towards a surface of a thermal barrier coating of a work piece. The imaging device is configured to capture image data of the surface of the thermal barrier coating by monitoring the illumination light reflected off the surface. The one or more processors are operably connected to the imaging device and configured to analyze the image data of the surface by comparing the image data to reference image data depicting a first designated microstructure. The first designated microstructure has an associated coating quality value. The one or more processors are configured to determine that the thermal barrier coating of the work piece has the first designated microstructure based on the analysis.

In one or more embodiments, a method for inspecting a thermal barrier coating of a work piece is provided. The method includes directing an illumination light having a controlled light characteristic towards a surface of the thermal barrier coating of the work piece. The method includes capturing image data of the surface of the thermal barrier coating by monitoring the illumination light reflected off the surface, and analyzing, via one or more processors, the image data of the surface by comparing the image data to reference image data depicting a first designated microstructure. The first designated microstructure has an associated coating quality value. The method also includes determining that the thermal barrier coating of the work piece has the first designated microstructure based on the analysis.

In one or more embodiments, a method for inspecting a thermal barrier coating of a work piece is provided. The method includes capturing image data of a surface of the thermal barrier coating of the work piece by monitoring an illumination light reflected off the surface. The method includes analyzing, via one or more processors, the image data of the surface by comparing the image data to both first reference image data depicting a first designated microstructure and second reference image data depicting a second designated microstructure. The first and second designated microstructures have different respective coating quality values. The method also includes generating a control signal that classifies the thermal barrier coating of the work piece as having the first designated microstructure or the second designated microstructure based on the analysis. The control signal classifies the thermal barrier coating of the work piece as having the first designated microstructure responsive to the image data of the surface more closely matching the first reference image data than the second reference image data. The control signal classifies the thermal barrier coating as having the second designated microstructure responsive to the image data of the surface more closely matching the second reference image data than the first reference image data.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
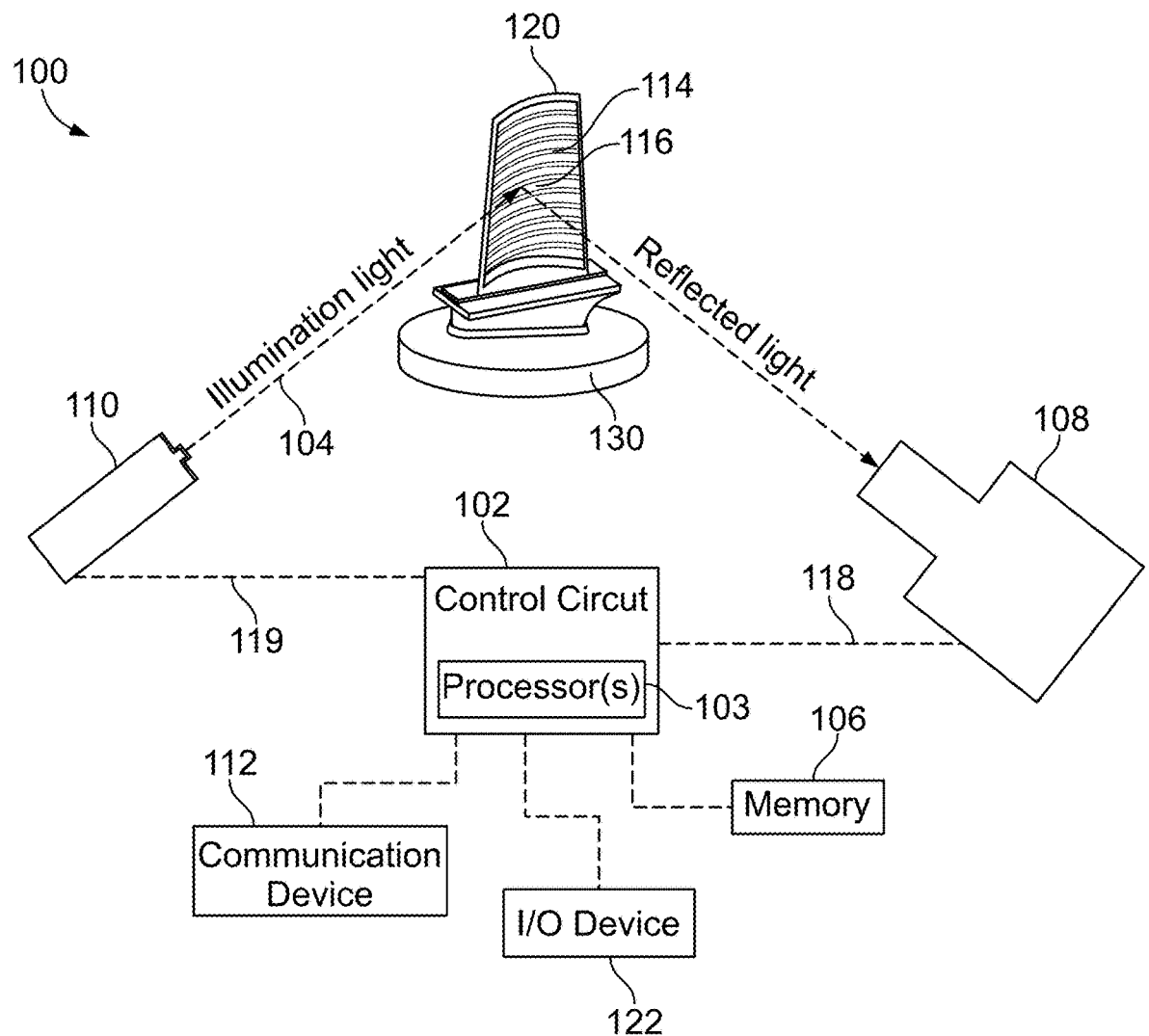
FIG. 1 is a block diagram of an inspection system according to an embodiment.

The embodiments described herein provide an inspection system and method for inspecting the quality of a thermal barrier coating on a work piece. The quality of a thermal barrier coating may generally refer to the ability of the thermal barrier coating to resist deterioration (e.g., spalling, cracks, etc.), calcium-magnesium-alumina-silicate (CMAS) deposits, and the like, and the provide thermal protection for the underlying base materials over time. For example, a higher quality thermal barrier coating may provide better thermal protection and/or better resistance to deterioration and CMAS deposits than a lower quality thermal barrier coating. Additionally or alternatively, the higher quality thermal barrier coating may provide similar thermal protection and/or resistance to deterioration and CMAS deposits as the lower quality thermal barrier coating, but may have the ability to provide such performance for a longer expected operating lifespan than the lower quality coating.

According to one or more embodiments, the quality of the thermal barrier coating is determined or quantified by analyzing a microstructure of the thermal barrier coating. Thermal barrier coatings that have different qualities may have different respective structures at a microscopic level. For example, a higher quality thermal barrier coating may have a different microstructure along the surface thereof than a lower quality thermal barrier coating. The microstructural differences may include different grain sizes, heights of grain peaks, shapes of grains, density of grains in a given area, density of grain boundaries, and/or the like. The differences in microstructures may be evident under a microscope, such that scanning electron microscope (SEM) images at the micrometer scale display structural differences. In one or more embodiments, the inspection system and method utilize the scattering and/or intensity properties of light reflecting off the surfaces of the thermal barrier coatings to differentiate the microstructures of thermal barrier coatings and detect qualities of the thermal barrier coatings.

During a coating quality inspection, an imaging device may monitor and capture an illumination light that is reflected off the surface of a work piece that is being inspected from a light source that directs the illumination light towards the work piece. The captured illumination light is analyzed and processed to determine a microstructure of the thermal barrier coating of the work piece. The microstructure may be determined by comparing the microstructure to one or more designated microstructures that have known or assigned coating qualities. For example, if the microstructure of the thermal barrier coating more closely resembles or matches a first designated microstructure that is associated with a high or satisfactory coating quality (e.g., above a quality threshold) than a second designated microstructure, then the microstructure is determined to be the first designated microstructure, and the thermal barrier coating is determined to have the high or satisfactory coating quality. Alternatively, if the microstructure of the thermal barrier coating more closely resembles or matches a second designated microstructure that is associated with a lower coating quality than the first designated microstructure, then the microstructure is determined to be the second designated microstructure, and the thermal barrier coating is determined to have the lower coating quality.

Determining the microstructures of the thermal barrier coatings, and associated coating qualities, provides numerous advantages. For example, the work pieces that have thermal barrier coatings with one or more microstructures indicative of relatively poor coating qualities can be segregated from the work pieces having higher quality thermal barrier coatings. By segregating the work pieces based on the microstructures, a machine, such as a gas turbine engine, can be assembled using only work pieces having a similar quality and expected operating lifespan. For example, a first gas turbine engine can be assembled using work pieces having high quality thermal barrier coatings, and a second gas turbine engine can be assembled using work pieces having lower quality thermal barrier coatings. By kitting the work pieces in this way, the first gas turbine may operate for a longer duration than the second gas turbine engine before requiring maintenance to replace the work pieces.

Furthermore, after determining which of the work pieces have a lower quality thermal barrier coating, those work pieces can be grouped for repair by stripping and then re-applying the coating materials. In addition, the inspection system and method may be utilized in a feedback loop during the manufacturing process of the work pieces. For example, if at least a threshold number or percentage of the thermal barrier coatings applied onto the work pieces during a coating application process are determined to have a microstructure associated with a lower quality coating (e.g., below a quality threshold), then the coating application process may be modified in an attempt to improve the quality of the thermal barrier coatings applied onto future work pieces. The coating application process may be modified by adjusting one or more control parameters, such as the humidity, temperature, pressure, or powder application rate of the coating application process.

FIG. 1 is a block diagram of an inspection system 100 according to an embodiment. The inspection system 100 is configured to inspect the thermal barrier coatings on work pieces by analyzing and identifying a microstructure of the thermal barrier coating. The inspection system 100 includes a control circuit 102, a light source 110, and an imaging device 108. The control circuit 102 is operably connected to imaging device 108, and is configured to receive image data from the imaging device 108. In one or more embodiments, the light source 110 directs an illumination light 104 towards a work piece 120 that has a thermal barrier coating 114. The illumination light 104 reflects off a surface 116 of the thermal barrier coating 114. The imaging device 108 monitors the light that is reflected off the surface 116. For example, the imaging device 108 captures image data of the surface 116 of the thermal barrier coating 114 by receiving the rays of illumination light 104 that are reflected towards the imaging device 108.

The control circuit 102 analyzes the image data captured by the imaging device 108 to determine a microstructure of the thermal barrier coating 114 of the work piece 120. As described herein, different designated microstructures have different associated coating quality values, so the determination of the microstructure indicates a quality of the thermal barrier coating 114. At the end of the inspection process, the control circuit 102 may generate a control signal to control a destination of the work piece 120 based on the determined microstructure (e.g., coating quality value). For example, the work piece 120 may be advanced to a subsequent manufacturing and/or assembly stage, grouped with other work pieces having the same microstructure as the work piece 120, scheduled for removal and re-application of the thermal barrier coating 114, or discarded entirely.

The inspection system 100 may be an automated system that illuminates the work pieces 120, captures the image data of the reflected light, and analyzes the image data to determine or classify the microstructures of the work pieces 120 without requiring human operator intervention. Optionally, an operator may selectively intervene in the inspection process by making operator input selections using a control device that is operably connected to the control circuit 102.

For example, the inspection system 100 optionally includes an input/output device 122 that can be utilized by an operator to participate in the inspection process.

The control circuit 102 includes one or more processors 103 and associated circuitry. For example, the control circuit 102 includes and/or represents one or more hardware circuits or circuitry that include, are connected with, or that both include and are connected with the one or more processors 103, controllers, and/or other hardware logic-based devices. The control circuit 102 may include a central processing unit (CPU), one or more microprocessors, a graphics processing unit (GPU), or any other electronic component capable of processing inputted data according to specific logical instructions.

The control circuit 102 may be operably connected to a memory storage device 106 (referred to herein as memory 106). The memory 106 is a tangible and non-transitory computer readable medium. The memory 106 may include or represent a flash memory, RAM, ROM, EEPROM, and/or the like. The control circuit 102 may execute programmed instructions stored on the memory 106 or stored on another tangible and non-transitory computer readable medium. The control circuit 102 and the memory 106 may obtain the image data of the work piece 120 directly from the imaging device 108, or indirectly via a storage device or a remote server. The control circuit 102 is operably connected to the imaging device 108 via a wired or wireless communication link 118. The obtained image data from the imaging device 108 may be stored in the memory 106 or stored in another storage device that is accessible to the control circuit 102.

The inspection system 100 is configured to inspect work pieces 120 having various shapes and sizes. In the illustrated embodiment, the work piece 120 is a rotor blade of a rotor assembly, such as a compressor or turbine. Non-limiting examples of other types of work pieces 120 that may be inspected by the inspection system 100 include combustor liners, nozzles, shafts, wheels, pistons, and the like. For example, the work piece 120 may be a metal component of an engine or other machinery for vehicular and/or industrial applications. The work piece 120 may have one or more metallic base materials, and at least a portion of the work piece 120 may be coated with the thermal barrier coating 114. The thermal barrier coating 114 has heat-resistant properties for protecting the underlying metal(s) from high temperatures during operation, such as combustion temperatures within a gas turbine engine. The thermal barrier coating 114 may include one or more layers, and at least one of the layers is composed of a ceramic material. The presence of the thermal barrier coating 114 increases the lifespan of the work piece 120 by reducing oxidation and thermal fatigue.

The work piece 120 is disposed on a base 130 or platform. Optionally, the work piece 120 remains stationary in a fixed position on the base 130 throughout the inspection process. Alternatively, the work piece 120 may be rotated during the inspection process by controlling the base 130 to swivel about a vertical axis. The work piece 120 may be rotated to direct the light that is reflected off the surface 116 towards the imaging device 108. Although only one work piece 120 is shown in FIG. 1, the base 130 may be a tray that holds multiple work pieces 120 side by side for consecutive inspection of the work pieces 120 on the tray. In an alternative embodiment, the work piece 120 may remain stationary while the light source 110 and/or the imaging device 108 move relative to the work piece 120 during the inspection process.

In the illustrated embodiment, the inspection system 100 includes a communication device 112 and an input/output (I/O) device 122 in addition to the control circuit 102, the memory 106, the light source 110, and the imaging device 108. The inspection system 100 optionally may include additional components not illustrated in FIG. 1. In an alternative embodiment, the inspection system 100 may have at least some different components than the components shown in FIG. 1. For example, the inspection system 100 may lack the communication device 112 and/or the I/O device 122 in the alternative embodiment.

The light source 110 directs the illumination light 104 towards the surface 116 of the thermal barrier coating 114. The light source 110 may generate the illumination light 104. The illumination light 104 has a controlled light characteristic, such as a controlled intensity, wavelength, beam width, polarity, pulse timing, and/or the like. The light source 110 may be one of multiple different types of light emitters, such as an incandescent light, a light emitting diode (LED), laser, flash lamp, or the like. The light source 110 may control a wavelength or wavelength range of the illumination light 104. For example, in at least one embodiment, the illumination light 104 is infrared light that is generated by the light source 110. The infrared (IR) light is within the IR band (or range) of wavelengths in the electromagnetic spectrum, which has longer wavelengths than the visible band. For example, the IR band of wavelengths may extend from about 700 nm to about 1 mm. As used herein, a wavelength that is "about" a specific value may include wavelengths within a designated range of that specific value, such as within 30 nm of the specific value. The light source 110 may be configured to generate other types of light other than IR light instead of having, or in addition to having, the capability to generate IR light. For example, the light source 110 may generate visible light (having a wavelength range between about 400 nm and about 750 nm) and/or ultraviolet (UV) light (having a wavelength range between about 1 nm to about 400 nm).

The illumination light 104 may have a broad band of wavelengths or a narrow band of wavelengths. For example, the light source 110 may have a filter for controlling the waveband of the illumination light 104. The filter may narrow the illuminant waveband to a narrow wavelength or wavelength range that is known to induce a particular reflection characteristic from one or more designated microstructures of the thermal barrier coating 114. The light source 110 may have one or more lenses and/or mirrors for controlling the illumination light 104 that is emitted therefrom, such as the direction, uniformity, and/or beam width of the illumination light 104. Alternatively, the light source may only emit light of a defined wavelength or within a narrow band of wavelengths (e.g., less than the entire spectrum of wavelengths in white light).

The light source 110 may be operably connected to the control circuit 102 via a wired and/or wireless communication link 119. The control circuit 102 may operate the light source 110 by controlling a light characteristic of the illumination light 104. For example, the control circuit 102 may control a wavelength or wavelength range of the illumination light 104 (e.g., IR, UV, visible light, broad spectrum, narrow spectrum, etc.), an intensity of the illumination light 104, a uniformity and/or polarity of the illumination light 104, a direction along which the illumination light 104 is emitted from the light source 110, and the like. The control circuit 102 may also activate and deactivate the light source 110. The control circuit 102 may control the light source 110 by generating control signals that are conveyed to the light source 110 via the communication link 119.

The imaging device 108 may represent or include at least one camera, sensor, scanner, or the like. The imaging device 108 is configured to receive and monitor the illumination light 104 reflected off the surface 116 of the thermal barrier coating 114 of the work piece 120. The imaging device 108 captures image data, such as one or more images and/or videos, of the reflected light. In an embodiment, the light source 110 emits IR light as the illumination light 104, and the imaging device 108 is a thermal or IR camera that captures the IR light reflecting off the surface 116. The light source 110 may have hardware for capturing visible light image data and/or UV light image data instead of, or in addition to, hardware for capturing IR image data. The imaging device 108 may have one or more filters and/or lenses designed to restrict the wavelengths permitted through the filters and/or lenses. For example, the imaging device 108 may have a barrier filter that permits only light within a certain band or range of wavelengths to penetrate the filter, excluding other wavelengths present in broad spectrum white light from being captured in the image data. The imaging device 108 captures image data that represents the subject matter in a field of view of the imaging device 108 at the time that the specific image data was captured.

The I/O device 122 of the inspection system 100 includes at least one display device and at least one user input device that allows an operator to interact with the inspection system 100. The I/O device 122 is operably connected to the control circuit 102. The display may be a liquid crystal display (e.g., light emitting diode (LED) backlight), an organic light emitting diode (OLED) display, a plasma display, a CRT display, and/or the like. The user input device may be a touchpad, a touchscreen, a mouse, a keyboard, physical buttons, or the like, that is configured to receive inputs from the operator. For example, the operator may use the I/O device 122 to view the results of the coating quality inspection and to select subsequent, responsive actions for the work piece 120, such as grouping the work piece 120 with other work pieces having similar coating microstructures, scheduling repair of the work piece 120, approving the work piece 120 for additional manufacturing and/or assembly, or discarding the work piece 120. The operator may also use the I/O device 122 for adjusting the coating application process based on the results of the inspection. For example, the operator may input various changes in the control parameters of the coating application process via the I/O device 122. The I/O device 122 optionally includes additional outputs, such as audio speakers, vibrating devices, or the like, for alerting the operator.

The communication device 112 includes hardware such as a transceiver, receiver, transmitter, and/or the like, and associated circuitry (e.g., antennas). The communication device 112 may be controlled by the control circuit 102 to wirelessly communicate with one or more of the components of the inspection system 100, such as the imaging device 108 and/or the light source 110. The communication device 112 may wirelessly connect the control circuit 102 to another device, such as a remote server, a mobile device (e.g., held by an operator), or the like.

Optionally, the control circuit 102, the memory 106, the communication device 112, and the I/O device 122 may be components within a common device, such as a computer (e.g., desktop, laptop, tablet, smart phone, mobile work station, etc.). For example, the control circuit 102, the memory 106, the communication device 112, and the I/O device 122 may be commonly surrounded within a housing or case.

Figure 2:
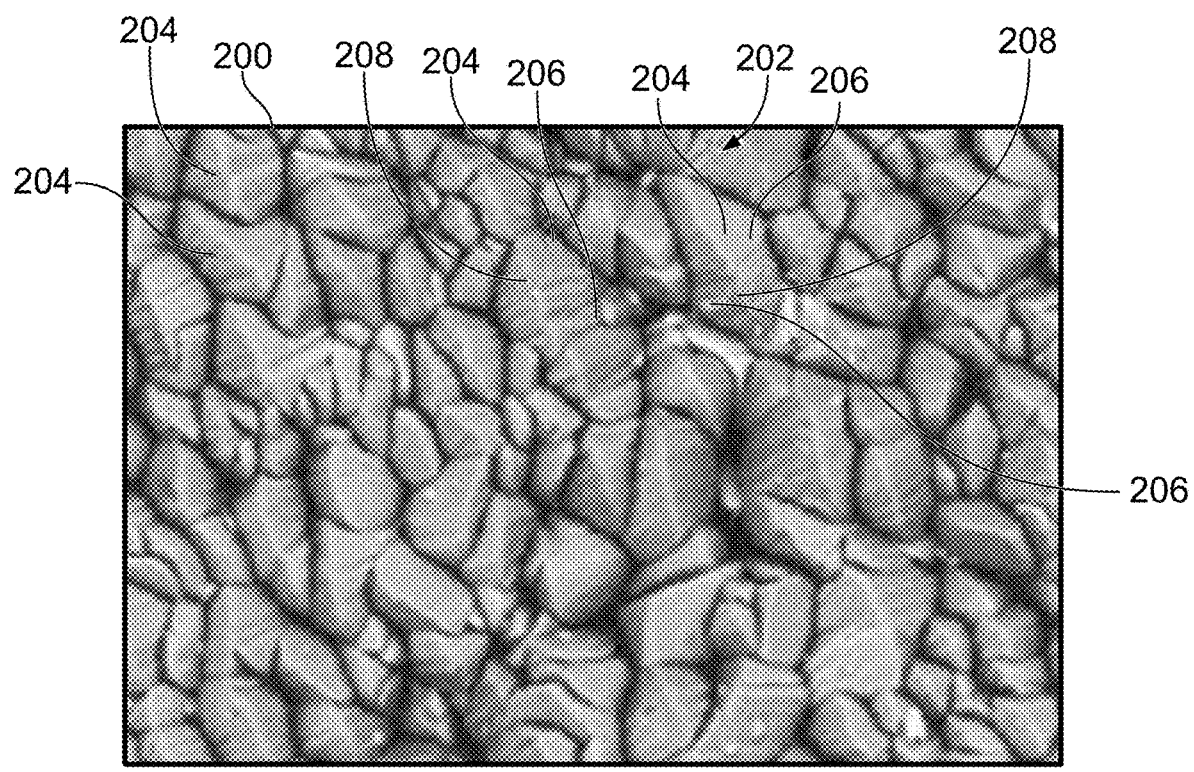
FIG. 2 is an enlarged image of a first designated microstructure of a surface of a thermal barrier coating according to an embodiment.

FIG. 2 is an enlarged image 200 of a first designated microstructure 202 of a surface of a thermal barrier coating according to an embodiment. The image 200 may be produced via a scanning electron microscope. The image 200 may depict the first designated microstructure 202 at a scale of about ten microns. For example, the width and/or length of the image 200 may be equivalent to about ten microns along the surface of the thermal barrier coating that is depicted. The microstructure 202 is referred to as a first designated microstructure because the microstructure 202 has defining characteristics that are present in the microstructures of other thermal barrier coatings having a similar coating quality as the thermal barrier coating depicted in FIG. 2. For example, the first designated microstructure 202 has a multitude of discrete grains 204 or kernels that resemble columns. The grains 204 generally have sloped sides 206 and sharp peaks 208, showing resemblance to a mountain range. Due to the columnar topology, the first designated microstructure 202 is also referred to herein as a columnar microstructure 202. The columnar microstructure 202 may also be defined by other characteristics of the microstructure 202, such as the average grain size, grain density per given area, grain boundary density, grain boundary width, and/or the like.

Figure 3:
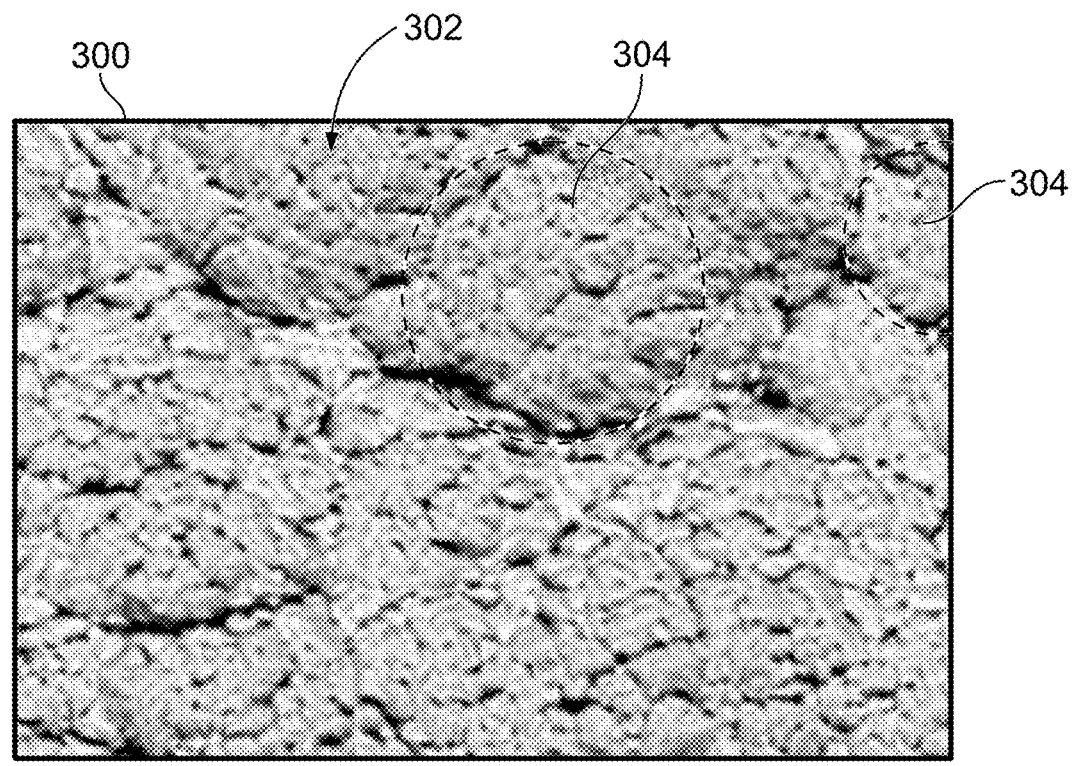
FIG. 3 is an enlarged image of a second designated microstructure of a surface of a thermal barrier coating according to an embodiment.

FIG. 3 is an enlarged image 300 of a second designated microstructure 302 of a surface of a thermal barrier coating according to an embodiment. Similar to the image 200 shown in FIG. 2, the image 300 may be produced via a scanning electron microscope and may depict the second designated microstructure 302 at a scale of about ten microns. The microstructure 302 is a second designated microstructure because the microstructure 302 has defining characteristics that are present in the microstructures of other thermal barrier coatings having a similar coating quality as the thermal barrier coating depicted in FIG. 3. The second designated microstructure 302 has a smoother surface topology than the columnar microstructure 202. For example, the second designated microstructure 302 has curved mound-like grains 304 instead of the sharp-peaked grains 204 of the columnar microstructure 202. The topology of the second designated microstructure 302 resembles the curd or head of a cauliflower, and for this reason is referred to herein as a cauliflower microstructure 302. The cauliflower microstructure 302 may also be defined (and differentiated from the columnar microstructure 202) by other characteristics of the microstructure 302, such as the average grain size, grain density per given area, grain boundary density, grain boundary width, and/or the like.

Referring now to both FIGS. 2 and 3, it has been determined that thermal barrier coatings with the columnar microstructure 202 (e.g., the first designated microstructure) have a different coating quality than thermal barrier coatings with the cauliflower microstructure 302 (e.g., the second designated microstructure). The quality of the thermal barrier coatings refers to the thermal properties, performance properties, and/or operational lifespan of the coatings. For example, a higher quality coating may have a greater resistance to deterioration and a greater operational lifespan than a lower quality coating. In another example, a higher quality coating may provide better thermal protection for the underlying base materials of the work piece than a lower quality coating, resulting in fewer and/or less severe local hot spots in the coating than the lower quality coating.

The coating qualities may be characterized by a coating quality value, which is a metric that numerically represents the quality of a thermal barrier coating. The coating quality values enable ranking and/or grouping multiple work pieces based on the quality of the thermal barrier coatings thereof. In a non-limiting example, the coating quality values may be integers in a scale from one to ten, with ten indicating the highest quality and one indicating the lower quality. A thermal barrier coating with a coating quality value of seven is determined or expected to have a greater coating quality than a thermal barrier coating with a coating quality value of five. Optionally, the scale and units of measure may be modified from the example above, such as a scale from one to one hundred instead of one to ten.

In at least one embodiment, the cauliflower microstructure 302 is associated with a higher coating quality than the columnar microstructure 202. Therefore, thermal barrier coatings that have the cauliflower microstructure 302 have a greater coating quality value than thermal barrier coatings that have the columnar microstructure 202. For example, coatings with the cauliflower microstructure 302 may have a coating quality value of ten out of ten (on a scale from zero to ten with ten being best), and coatings with the columnar microstructure 202 may have a quality value of five out of ten. The thermal barrier coatings that have the cauliflower microstructure 302 may be more resistant to deterioration (e.g., spalling, chipping, flaking, cracking, etc.), local hot spots, and/or CMAS than the thermal barrier coatings that have the columnar microstructure 202. As a result, the coatings with the cauliflower microstructure 302 may have, in general, longer operational lifespans than the coatings with the columnar microstructure 202. The cauliflower microstructure 302 is generally preferable over the columnar microstructure 202 due to the inherent benefits of increased performance and/or extended lifespan that are associated with the thermal barrier coatings that have the cauliflower microstructure 302.

These performance differences in the thermal barrier coatings may be attributable to the different microstructures 202, 302 of the thermal barrier coatings. The two distinct microstructures 202, 302 of thermal barrier coatings shown in FIGS. 2 and 3, respectively, may be produced via the same coating application process. For example, the thermal barrier coating applied on a first work piece may have the cauliflower microstructure 302 when viewed under a microscope. The thermal barrier coating applied, via the same coating application process, on a second work piece immediately following the first work piece may have the columnar microstructure 202 without any controlled modification of the coating application process. The structural differences in the microstructures 202, 302 may be attributable to unintentional and/or uncontrollable variances and/or defects during the coating application process or another manufacturing stage. For example, a slight temperature or humidity change between the time that the first work piece is coated and the time that the second work piece is coated may cause the formation of the columnar microstructure 202 instead of the cauliflower microstructure 302.

Optionally, the coating quality value associated with the columnar microstructure 202 may be below a predefined quality threshold. The coating quality value associated with the cauliflower microstructure 302 may be at or above the predefined quality threshold. The predefined quality threshold may be set at a coating quality value or level that is between the respective coating quality values of the columnar and cauliflower microstructures 202, 302. In a non-limiting example, referring to the scale of integers from zero to ten, the predefined quality threshold may be 7 or 7.5, such that the columnar microstructure 202, with a coating quality value of 5, is below the quality threshold and the cauliflower microstructure 302, with a coating quality value of 10, is above the quality threshold. The predefined quality threshold may be selected such that coating qualities above the threshold have characteristics or attributes that allow the thermal barrier coating to satisfy certain performance standards or requirements. For example, thermal barrier coatings above the coating quality threshold are expected to have an operational lifespan that is at least a preselected lifespan, such as a certain number of years or a certain accumulated run time or distance traveled (for a vehicle application). Thermal barrier coatings below the coating quality threshold may have expected lifespans that are shorted than the preselected lifespan. Because the coating quality value associated with the columnar microstructure 202 may be below the predefined quality threshold, upon determining that a sample thermal barrier coating has the columnar microstructure 202, the inspection system 100 may take one or more remedial and/or responsive actions, as described herein, such as removing and reapplying the thermal barrier coating, discarding the work piece, or grouping the work piece with other work pieces determined to also have the columnar microstructure 202.

The inspection system 100 is configured to determine whether a sample thermal barrier coating that is being inspected has the columnar microstructure 202 or the cauliflower microstructure 302. For example, the inspection system 100 is configured to determine whether the thermal barrier coating 114 of the work piece 120 shown in FIG. 1 has the columnar microstructure 202 depicted in the image 200 in FIG. 2, or the cauliflower microstructure 302 depicted in the image 300 in FIG. 3. Although only two designated microstructures are shown and described, the inspection system 100 may be utilized for differentiating between three or more different designated microstructures having different coating quality values. For example, the inspection system 100 may determine that multiple different designated microstructures surpass a predefined quality threshold, and may also rank the passing microstructures to designate one as having a greater quality than one or more other passing microstructures.

The inspection system 100 is configured to inspect the quality of a thermal barrier coating of a work piece based on the microstructure of the thermal barrier coating. For example, the inspection system 100 utilizes the reflective properties of the sample thermal barrier coating 114 of the work piece 120 to identify the microstructure of the thermal barrier coating 114 as more closely matching or resembling the columnar designated microstructure 202 or the cauliflower designated microstructure 302. If the reflective properties of the sample thermal barrier coating 114 indicate that the microstructure thereof more closely matches the columnar designated microstructure 202, then the inspection system 100 determines that the sample thermal barrier coating 114 has the columnar designated microstructure 202. Consequentially, the inspection system 100 determines that the sample thermal barrier coating has the coating quality (e.g., coating quality value) associated with the columnar microstructure 202. Conversely, if the reflective properties of the sample thermal barrier coating 114 indicate that the microstructure thereof more closely matches the cauliflower designated microstructure 302, then the inspection system 100 determines that the sample thermal barrier coating 114 has the cauliflower designated microstructure 302 and the coating quality associated with the cauliflower microstructure 302.

The reflective properties of the thermal barrier coating 114 are ascertained by the light source 110 directing the illumination light 104 towards the surface 116 of the thermal barrier coating 114 of the work piece 120. The imaging device 108 receives and monitors the illumination light 104 that reflects off the surface 116. The imaging device 108 captures image data of the surface 116 of the thermal barrier coating 114 based on the reflected illumination light 104. The image data may include one or more still images or one or more videos each including multiple image frames. The control circuit 102 (e.g., one or more processors 103 thereof) obtains the image data of the surface 116 captured by the imaging device 108 and analyzes the image data to determine whether the thermal barrier coating 114 of the work piece 120 has a specific designated microstructure, such as the columnar microstructure 202, the cauliflower microstructure 302, or another designated microstructure.

The control circuit 102 analyzes the image data of the thermal barrier coating 114 by comparing the image data (e.g., characteristics thereof) to reference image data depicting one or more of the designated microstructures. For example, the control circuit 102 may compare the image data to reference image data depicting the columnar microstructure 202 (which may be referred to as a first ground truth image). The image 200 in FIG. 2 may represent reference image data of the columnar microstructure 202. Additionally, or alternatively, the control circuit 102 may compare the image data to reference image data depicting the cauliflower microstructure 302 (which may be referred to as a second ground truth image). The image 300 in FIG. 3 may represent reference image data of the cauliflower microstructure 302.

The control circuit 102 determines the microstructure of the sample thermal barrier coating 114 based on how well the image data matches or resembles the reference image data, as described herein. For example, the control circuit 102 may determine that the microstructure of the sample thermal barrier coating 114 has the cauliflower microstructure 302 based on a light characteristic or property of the image data of the sample thermal barrier coating 114 being within a designated threshold of the reference image data of the cauliflower microstructure 302. The light characteristic may include an intensity, gradient pattern or signature, shadow details, structural shape details (e.g., edges, sizes, etc.), and the like. Optionally, instead of relying on a designated threshold, the control circuit 102 may determine that the microstructure of the sample thermal barrier coating 114 has the cauliflower microstructure 302 based on the image data more closely matching the reference image data of the cauliflower microstructure 302 than the reference image data of the columnar microstructure 202.

Unlike known thermal barrier coating inspection techniques, the inspection system 100 and process described herein does not require measuring a thickness of the coating, performing a chemical operation on the coating, extracting a physical sample of the coating, or otherwise damaging or interfering with the integrity of the thermal barrier coating that is being inspected. The inspection system 100 may also be more efficient (e.g., less time and energy intensive) than the known thermal barrier coating inspection techniques. The inspection system 100 is based on the reflective properties of the surface 116 of the thermal barrier coating 114 obtained by directing the illumination light 104 towards the surface 116 and monitoring the reflected light.

Figure 4:
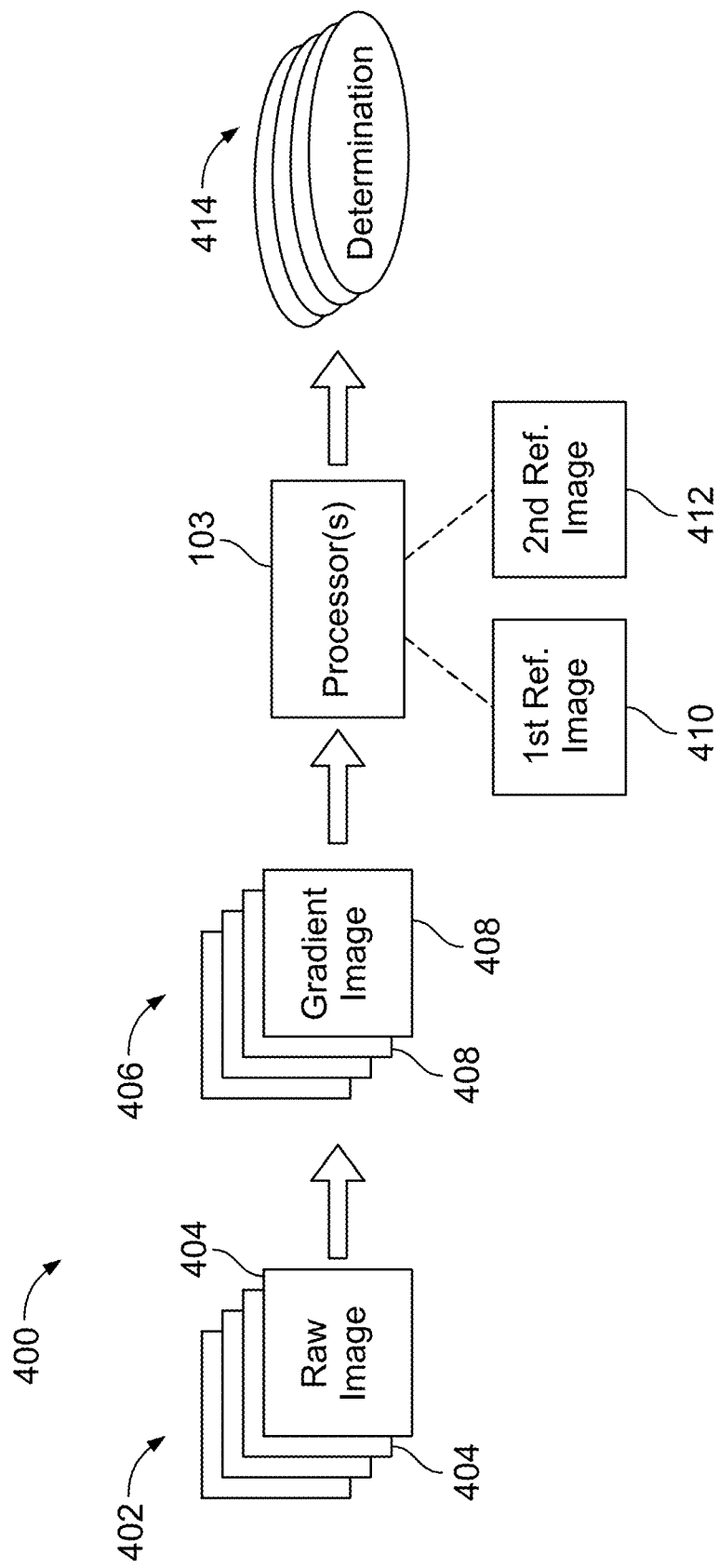
FIG. 4 is a diagram of an inspection process performed by the inspection system according to an embodiment.

FIG. 4 is a diagram 400 of an inspection process performed by the inspection system 100 (shown in FIG. 1) according to an embodiment. For example, a series 402 of raw images 404 are obtained from the imaging device 108 shown in FIG. 1. The series 402 of raw images 404 refers to the image data captured by the imaging device 108. The raw images 404 depict the thermal barrier coatings 114 of one or more work pieces 120 being inspected. For example, at least some of the raw images 404 in the series 402 depict the thermal barrier coatings 114 of different work pieces 120. In the illustrated embodiment, the four raw images 404 in the series 402 depict the thermal barrier coatings 114 of four different work pieces 120, but it is understood that at least some work pieces 120 may be imaged multiple times to show the thermal barrier coating 114 at different areas of the same work piece 120.

In an embodiment, the inspection system 100 is configured to consecutively inspect a multitude of work pieces 120. Once an individual work piece 120 is secured on the base 130 (shown in FIG. 1), the light source 110 is controlled to direct the illumination light 104 toward the work piece 120, and image data of the reflected light is captured by the imaging device 108 during an image acquisition stage. Then, the work piece 120 is removed and replaced with another work piece 120 to be inspected, and the process repeats. Alternatively, if the work pieces 120 are small enough, multiple work pieces 120 may be positioned together on the base 130, so the inspection system 100 can acquire image data of the multiple work pieces 120 before removing and replacing the work pieces 120. The inspection system 100 acquires the image data of the different work pieces 120 on the base 130 by modifying the direction of the illumination light 104 and/or modifying the positioning of the base 130.

The one or more processors 103 may access or receive the raw images 404 from the imaging device 108 (or an intermediate storage device) all at once or one by one during the image acquisition stage. Using the raw images 404 that depict the thermal barrier coatings 114 of the work pieces 120, the one or more processors 103 are configured to generate a series 406 of gradient images 408. Each gradient image 408 is generated based on a particular one of the raw images 404. Thus, the four gradient images 408 in the series 406 correspond to the four raw images 404 in the series 402. The gradient image generation process may be equivalent to a high pass filter. The gradient images 408 are generated by filtering the raw images 404 based on a specific property, such as frequency, intensity, or the like. For example, pixels in each raw image 404 that exceed a designated threshold with regard to the specific property are copied into the gradient image 408 and pixels that do not exceed the designated threshold are filtered out, such that the gradient image 408 has a dark spot in the equivalent location of that pixel. Alternatively, the pixels that exceed the designated threshold are filtered out of the gradient image 408. The designated threshold may be a predefined value, such as a specific frequency value or a specific intensity value.

The one or more processors 103 (also referred to in the singular as processor 103 herein) analyze the gradient images 408 to determine the microstructures of the thermal barrier coatings 114 of the work pieces 120. The processor 103 analyzes the gradient images 408 by comparing the gradient images 408 to reference image data depicting at least one of the designated microstructures 202, 302. For example, FIG. 4 shows a first reference image 410 and a second reference image 412. The first reference image 410 is reference image data depicting the columnar microstructure 202. The first reference image 410 may be a gradient image that is generated based on the raw image 200 (shown in FIG. 2) of the columnar microstructure 202. Therefore, if a gradient image 408 closely matches or resembles the first reference image 410, then the specific thermal barrier coating 114 depicted in that gradient image 408 is determined to have the columnar microstructure 202.

The determination may utilize multiple reference images (e.g., image data) that depict different designated microstructures. For example, in FIG. 4, the processor 103 also has access to the second reference image 412, which is reference image data depicting the cauliflower microstructure 302. The second reference image 412 may be a gradient image that is generated based on the raw image 300 (shown in FIG. 3) of the cauliflower microstructure 302. The processor 103 may compare each (or at least some) of the gradient images 408 to both the first reference image 410 and the second reference image 412. Comparing a gradient image 408 to both of the reference images 410, 412 may improve the accuracy of the determination relative to comparing the gradient image 408 to only the first reference image 410 or only the second reference image 412.

The processor 103 makes a determination regarding the microstructure for each of the thermal barrier coatings 114 of the work pieces 120 being inspected. For example, for the four thermal barrier coatings 114 depicted in the four raw images 404 in FIG. 4, the processor 103 makes a set 414 of four independent determinations. The determination may consist of identifying or classifying each of the thermal barrier coatings 114 as having (or not having) either the columnar microstructure 202 or the cauliflower microstructure 302. For example, the processor 103 may determine that a first thermal barrier coating 114 has the columnar microstructure 202, and a second thermal barrier coating 114 does not have the columnar microstructure 202 (indicating that the second coating 114 has the cauliflower microstructure 302 unless there are more than two designated microstructure types). The processor 103 may also be configured to indicate a confidence level in the determination. For example, a low confidence determination is more likely to be incorrect than a high confidence determination.

Figure 5:
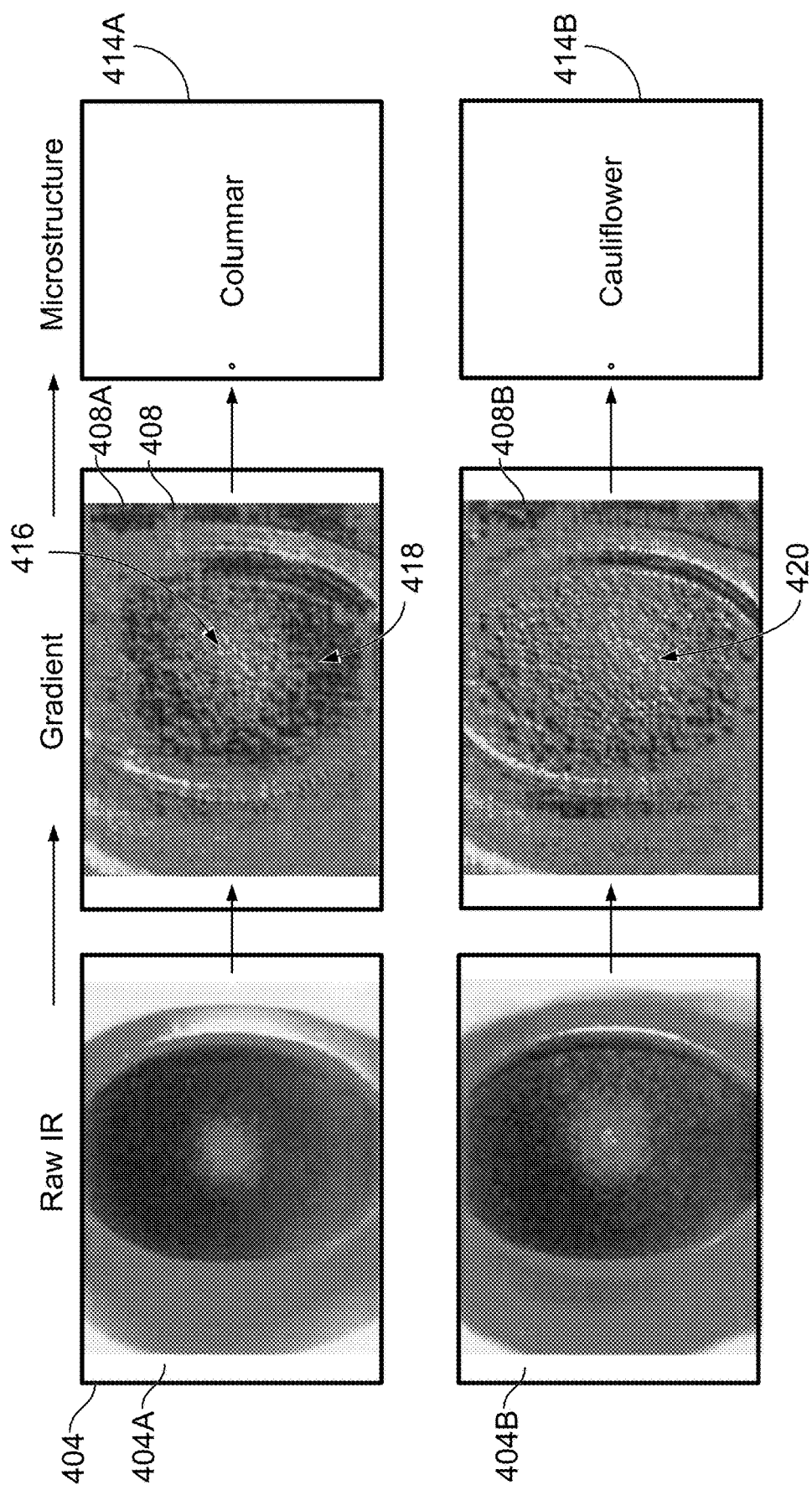
FIG. 5 shows two raw images captured by an imaging device of the inspection system that are analyzed according to the embodiment shown in FIG. 4.

FIG. 5 shows two of the raw images 404 captured by the imaging device 108 of the inspection system 100 that are analyzed according to the embodiment shown in FIG. 4. In the illustrated embodiment, the two raw images 404, including a first raw image 404A and a second raw image 404B, are infrared (IR) images. For example, the light source 110 may generate the illumination light 104 as IR light having a wavelength in the IR range. The IR light represents a controlled light characteristic of the illumination light 104. The imaging device 108 is configured to capture IR images. For example, the imaging device 108 may be an IR camera. The first raw image 404A depicts the thermal barrier coating of one work piece, and the second raw image 404B depicts the thermal barrier coating of another work piece. The inspection system 100 is configured to determine the microstructure of the thermal barrier coating of each of the two work pieces. The microstructures are used to classify the thermal barrier coatings in terms of quality, as described above.

FIG. 5 also shows two gradient images 408 that are generated based on the raw images 404A, 404B. For example, a first gradient image 408A is generated based on the first raw image 404A, and a second gradient image 408B is generated based on the second raw image 404B. As described in FIG. 4, the processor 103 is configured to analyze each of the gradient images 408A, 408B by comparing the gradient images 408A, 408B to reference image data associated with at least one of the designated microstructures (e.g., columnar and cauliflower). For example, a gradient image of the columnar microstructure 202 may have a different signature pattern or other characteristic than a gradient image of the cauliflower microstructure 302 (shown in FIG. 3).

In an embodiment, for each gradient image 408, the processor 103 is configured to compare a pattern in the gradient image 408 to a pattern in the reference image data. For example, the first reference image 410 in FIG. 4 may represent a gradient image depicting the columnar microstructure 202 (shown in FIG. 2). The processor 103 compares a pattern in the first gradient image 408A to a pattern in the reference image 410. The processor 103 may compare the patterns by performing a pattern recognition algorithm. The pattern recognition algorithm may include performing image analysis to detect patterns in the image data of both the first gradient image 408A and the first reference image 410, and subsequently performing a pattern-matching algorithm to compare the two detected patterns. Optionally, if the compared patterns match, correspond, pair, or complement one another to a degree that exceeds a designated similarity threshold, then the processor 103 determines that the thermal barrier coating depicted in the first raw image 404A (used to generate the first gradient image 408A) has the columnar microstructure 202. The similarity threshold may be a percentage of matching between the gradient image 408A and the reference image 410. In a non-limiting example, the similarity threshold may be set at 70%. If the pattern or other characteristics of the gradient image 408A match the reference image 410 at or beyond 70%, then the processor 103 determines that the gradient image 408A depicts the same microstructure as the reference image 410. If the similarity between the pattern of the gradient image 408A and the reference image 410 is less than the similarity threshold, then the processor 103 may determine that the microstructures are not the same (or probably not the same).

Optionally, the similarity threshold (and other thresholds described herein) may be based on preselected information classification values, such as precision and recall values. For example, the precision for a class is the number of true positives (e.g., number of elements, such as gradient images 408, correctly labeled as belonging to the positive class, such as the columnar microstructure) divided by the total number of gradient images labeled as belonging to the positive class (e.g., the columnar microstructure). The recall for a class is the number of true positives divided by the total number of elements that actually belong to the positive class (e.g., the sum of true positives and false negatives, which are elements that should have been labeled as belonging to the positive class but were incorrectly labeled). The precision value and/or recall value could be used as constraints for determining the threshold. Optionally, the threshold could relate to a score utilizing the precision and recall values. For example, the threshold could be based on an F-score, which is (2*Precision*Recall)/(Precision+Recall).

The patterns may be compared based on various properties and characteristics in the images. For example, the processor 103 may calculate an average pixel intensity or wavelength of the entire image or a sub-area of the image. The processor 103 may also compare patterns by measuring the variations in pixel intensity or wavelength within sub-areas of the images. For example, the pixels in a sub-area of one pattern may be more uniform and/or consistent than the pixels in a sub-area of another pattern. The processor 103 may compare patterns by identifying specific features in the images and comparing the properties of the features in the images. For example, the processor 103 may identify a cluster of pixels in each of the patterns, and may measure the diameters of the clusters to compare the patterns.

In one or more embodiments, the processor 103 may compare the patterns of the gradient images 408 to both of the reference images 410, 412 (shown in FIG. 4). For example, the pattern of the first gradient image 408A may match the first reference image 410 associated with the columnar microstructure 202 at or beyond the designated similarity threshold and may match the second reference image 412 associated with the cauliflower microstructure 302 less than the designated similarity threshold. As a result, the processor 103 determines that the raw image 404A depicts a thermal barrier coating having the columnar microstructure 202, as shown by a first output determination 414A in FIG. 5. Furthermore, the pattern of the second gradient image 408B may match the first reference image 410 associated with the columnar microstructure 202 less than the designated similarity threshold and may match the second reference image 412 associated with the cauliflower microstructure 302 at or beyond the designated similarity threshold. As a result, the processor 103 determines that the raw image 404B depicts a thermal barrier coating having the cauliflower microstructure 302, as shown by a second output determination 414B in FIG. 5.

In an embodiment, if the analysis indicates that the pattern of a given gradient image 408 fails to meet the designated similarity threshold when compared with both of the reference images 410, 412, then the processor 103 determines that the microstructure is unknown and additional inspection is required. For example, if the analysis indicates that the microstructure of the thermal barrier coating is unlikely to be columnar and is unlikely to be cauliflower, then additional inspection, such as manual inspection, is requested. The processor 103 may make the same determination if the analysis indicates that the pattern of a given gradient image 408 meets or exceeds the designated similarity threshold when compared to both of the reference images 410, 412.

In the illustrated example shown in FIG. 5, the processor 103 determines that the first raw image 404A depicts a thermal barrier coating having the columnar microstructure 202, and the second raw image 404B depicts a thermal barrier coating having the cauliflower microstructure 302. It is apparent from the illustrated gradient images 408A, 408B generated based on the respective raw images 404A, 404B that the first gradient image 408A has a different pattern than the second gradient image 408B. For example, the first gradient image 408A has a bright center cluster 416 surrounded by a darker ring 418. The second gradient image 408B has a more uniform distribution than the first gradient image 408A. For example, the second gradient image 408B has a cluster 420, but lacks a dark ring surrounding the cluster 420. The cluster 420 also has a larger diameter than the center cluster 416 of the first gradient image 408A. The pattern of the first gradient image 408A more closely corresponds or matches better with the first reference image 410 associated with the columnar microstructure 202. The pattern of the second gradient image 408B more closely corresponds or matches better with the second reference image 412 associated with the cauliflower microstructure 302.

Figure 6:
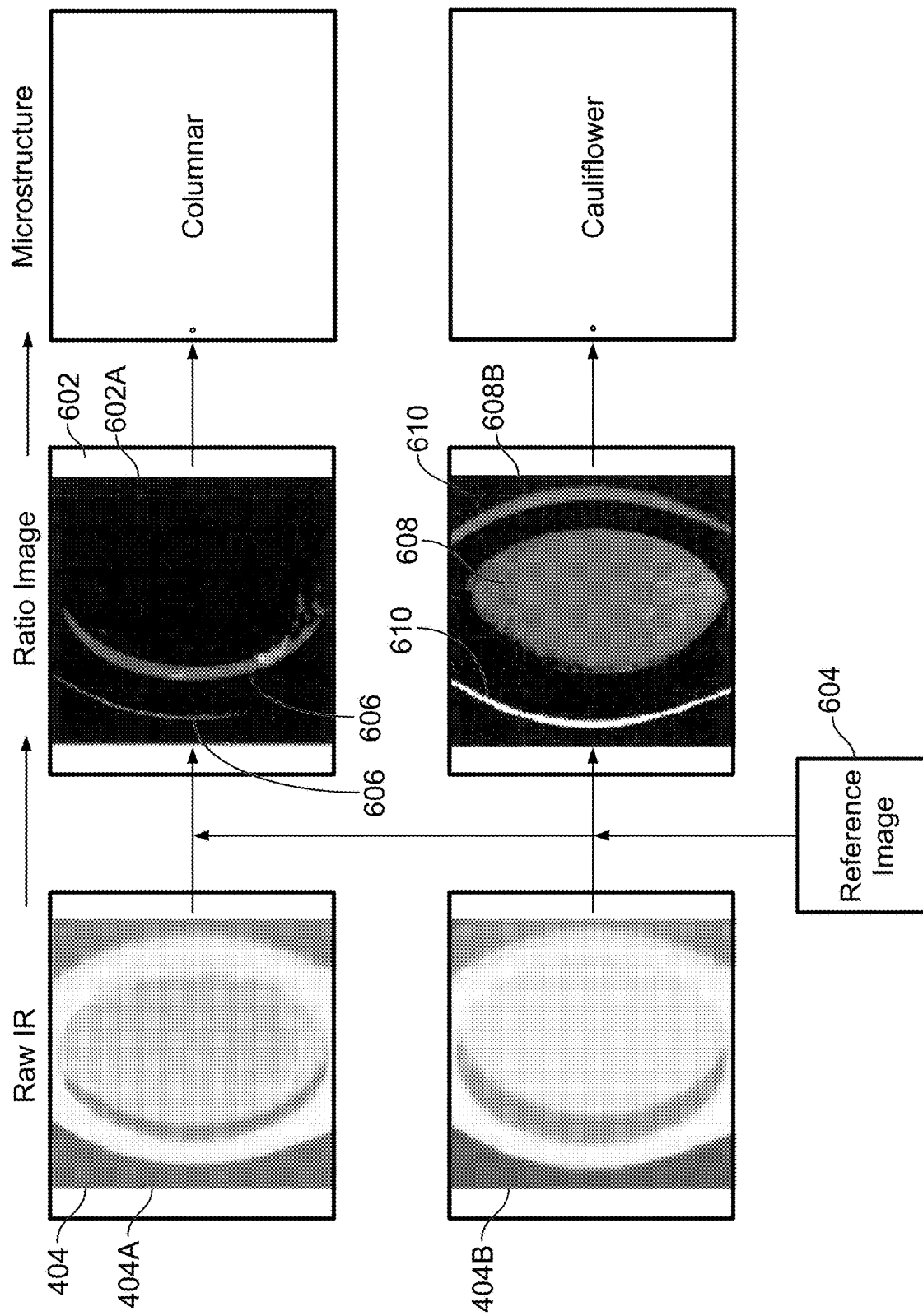
FIG. 6 shows two raw images captured by the imaging device of the inspection system that are analyzed according to another embodiment.

FIG. 6 shows two of the raw images 404 captured by the imaging device 108 of the inspection system 100 that are analyzed according to another embodiment. In the illustrated embodiment, the processor 103 analyzes the raw images 404 by calculating or generating one or more ratio images 602 instead of generating the gradient images 408 shown in FIGS. 4 and 5. The two raw images 404A, 404B shown in FIG. 6 may be the same as the raw images 404A, 404B shown in FIG. 5. For example, the raw images 404A, 404B may be IR images captured by IR light from the light source 110 that reflects off the surfaces of two different work pieces. FIG. 6 shows a first ratio image 602A and a second ratio image 602B. The first ratio image 602A is based on both the first raw image 404A and a reference image 604. The reference image 604 optionally may be associated with one of the designated microstructures. The second ratio image 602B is based on both the second raw image 404B and the same reference image 604. Thus, both of the ratio images 602A, 602B are based on a common reference image 604. In the illustrated embodiment, the reference image 604 depicts the cauliflower microstructure 302 (shown in FIG. 3). For example, the reference image 604 may be the image 300 shown in FIG. 3.

The first ratio image 602A is generated as a ratio of the first raw image 404A to the reference image 604. This may involve overlaying or superimposing the first raw image 404A on the reference image 604. The processor 103 may calculate a first ratio associated with the first ratio image 602A by dividing the first raw image 404A (or pixel characteristics thereof) by the reference image 604. For example, the first ratio may be calculated by comparing equivalent pixels of the two images 404A, 604 or by comparing equivalent areas of the two images 404A, 604. The first ratio image 602A shown in FIG. 6 is mostly dark with only a couple of visible curved lines 606. The first ratio associated with the first ratio image 602A may be calculated to be relatively low. For example, the first ratio may be below a predefined similarity threshold associated with the cauliflower microstructure. In a non-limiting example, the predefined similarity threshold may be 0.5, and the first ratio is calculated to be 0.2. The low first ratio indicates that the first raw image 404A does not align or match very well with the reference image 604. Because the reference image 604 depicts the cauliflower microstructure, the processor 103 may determine that the first raw image 404A does not depict the cauliflower microstructure. Optionally, the processor 103 may deduce that the first raw image 404A depicts the columnar microstructure by process of elimination.

The second ratio image 602B is generated as a ratio of the second raw image 404B to the reference image 604. The processor 103 calculates a second ratio associated with the second ratio image 602B by dividing the second raw image 404B (or pixel characteristics thereof) by the reference image 604. The second ratio image 602B shown in FIG. 6 has a visible oval 608 with two visible curved lines 610 on either side of the oval 608. The greater amount of visible area in the second ratio image 602B compared to the first ratio image 602A indicates that the second raw image 404B matches or corresponds better to the reference image 604 than the first raw image 404A. The second ratio associated with the second ratio image 602B may be greater than the first ratio associated with the first ratio image 602A. For example, the second ratio may be at or greater than the predefined similarity threshold associated with the cauliflower microstructure. In a non-limiting example, the second ratio may be 0.9, which is greater than the 0.5 similarity threshold. In response to the relatively high extent of matching between the second raw image 404B and the reference image 604 depicting the cauliflower microstructure, the processor 103 determines that the second raw image 404B depicts the cauliflower microstructure.

In an embodiment, the ratio method of analysis described above may be performed using both the reference image 604 associated with the cauliflower microstructure and another reference image associated with the columnar microstructure. In the example above, the first ratio indicates that the first raw image 404A does not depict the cauliflower microstructure. The processor 103 may generate or calculate a third ratio based on the first raw image 404A and the reference image associated with the columnar microstructure. If the third ratio is greater than a predefined similarity threshold associated with the columnar microstructure, then the processor 103 determines that the first raw image 404A has the columnar microstructure. Furthermore, a fourth ratio may be calculated based on the second raw image 404B and the reference image associated with the columnar microstructure. If the fourth ratio is below the predefined similarity threshold, then the second raw image 404B is confirmed as depicting the cauliflower microstructure. Generating the ratios based on reference images associated with both of the designated microstructures may improve the accuracy of the inspection system 100 relative to generating ratios based only on a single reference image. For example, if the two ratios indicate that a given raw image has both cauliflower and columnar microstructures, or has neither microstructure, then the processor 103 indicates that the thermal barrier coating depicted in the raw image is unknown and requires additional inspection.

Reference is now made back to FIG. 1 to describe another embodiment in which the inspection system 100 analyzes the image data depicting a thermal barrier coating to determine the microstructure of the thermal barrier coating. The light source 110 may be configured to modify the properties of the illumination light 104 to capture image data of the same thermal barrier coating 114 under different lighting conditions. The processor 103 may be configured to determine the microstructure based on an intensity of the image data under one or more specific lighting conditions.

For each work piece 120 that is inspected, the control circuit 102 may control the light source 110 to generate the illumination light 104 to have a first selected wavelength range. For example, the first selected wavelength range may be a narrow band of light within the IR range, the visible range, or the UV range. The first selected wavelength range represents a controlled light characteristic of the illumination light 104. The imaging device 108 captures image data of the illumination light 104 reflected off the surface 116 of the thermal barrier coating 114. The first wavelength range may be selected based on a known discrepancy in how the two designated microstructures, columnar and cauliflower, reflect light having the first wavelength range. The first wavelength range may be associated with one of the designated microstructures. For example, the first wavelength range may be associated with the columnar microstructure 202 (shown in FIG. 2), and the columnar microstructure 202 may reflect a greater amount of light having the first wavelength range than an amount of the same light that is reflected by the cauliflower microstructure 302 (shown in FIG. 3). Due to structural differences, the cauliflower microstructure 302 may absorb or dissipate more of the light than the columnar microstructure 202. Therefore, the intensity of the light reflected from the columnar microstructure 202 may be greater than the intensity of the light reflected from the cauliflower microstructure 302 (for the given wavelength).

The processor 103 may analyze the captured image data depicting the light reflected off the sample thermal barrier coating 114 to measure the intensity of the image data. The processor 103 may compare the measured intensity of the image data to a known intensity of light (having the first wavelength) that is reflected from the columnar microstructure 202 to determine if the image data depicts the columnar microstructure 202. For example, if the measured intensity is within a designated threshold window or range of the known intensity associated with the columnar microstructure 202, then the processor 103 determines that the thermal barrier coating 114 of the work piece 120 has the columnar microstructure 202. The threshold window or range may be a percentage window of within 5%, within 10%, within 20%, or the like. If the measured intensity of the image data differs from the known intensity by more than the threshold window (e.g., more than 20%), then the processor 103 determines that the thermal barrier coating 114 does not have the columnar microstructure 202.

The processor 103 may also compare the measured intensity of the image data to a known intensity of light that is reflected from the cauliflower microstructure 302 to determine if the image data depicts the cauliflower microstructure 302. Optionally, the illumination light 104 is generated that has the first wavelength range and the reflected light is captured by the imaging device 108, the processor 103 may control the light source 110 to generate another illumination light 104 that has a different, second wavelength range which is discrete (e.g., non-overlapping) with the first wavelength range. The second wavelength range may be selected based on the reflective properties of the designated microstructures. For example, the cauliflower microstructure 302 may reflect a greater amount of light having the second wavelength range than an amount of the same light that is reflected by the columnar microstructure 202. The imaging device 108 captures image data depicting the light reflected off the thermal barrier coating 114. The processor 103 may compare the intensity of the measured reflected light to the known intensity of light (having the second wavelength range) that is reflected from the cauliflower microstructure 302 to determine if the image data depicts the cauliflower microstructure 302.

Therefore, the inspection system 100 may capture multiple images of the thermal barrier coating 114 of each work piece 120 under different lighting conditions, and may compare properties of the images, such as intensity, to known properties associated with the designated microstructures 202, 302 to determine the microstructure of the thermal barrier coating 114. Comparing the measured intensity to both the known intensity of reflected light from the columnar microstructure 202 and the known intensity of reflected light from the cauliflower microstructure 302 (at the same or different wavelengths of light) may produce more accurate determinations than merely relying on a comparison to a single data metric.

Referring back to FIG. 6, another embodiment utilizes a variation of the ratio method. For example, the reference image 604 shown in FIG. 6 may be a work piece reference image, which is an image of the work piece 120 that is being tested. The work piece reference image 604 is generated while the work piece 120 is illuminated with a light having a designated reference wavelength (e.g., frequency) range. For example, the designated reference wavelength range may represent a wavelength to which neither of the two or more designated microstructures is particularly sensitive. Due to these properties, an image of the columnar microstructure 202 generated while illuminated with the reference wavelength may be difficult to distinguish from an image of the cauliflower microstructure 302 that is generated while illuminated with the same reference wavelength. In this embodiment, before or after the work piece 120 is illuminated with the light having the reference wavelength to generate the work piece reference image 604, the work piece 120 is illuminated with selected illumination light. The selected illumination light has a narrow wavelength range that is selected based on known discrepancies in how the different designated microstructures absorb and reflect light.

For example, the narrow wavelength range may be the first wavelength range described above, which is particular to the columnar microstructure 202 such that the columnar microstructure 202 reflects the selected illumination light with a greater intensity than the intensity at which the cauliflower microstructure 302 reflects the same illumination light. A raw image (e.g., 404A) is generated to capture the light (of the first wavelength range) reflected off the surface of the work piece 120. A ratio image (e.g., 602A) is then generated based on the raw image and the work piece reference image 604. The ratio image is analyzed similar to the first ratio embodiment described above with reference to FIG. 6. This embodiment differs from the other ratio embodiment because this embodiment is self-referencing. For example, this embodiment does not rely on a separate, ground truth reference image that is associated with a known microstructure, but rather utilizes an image of the tested work piece 120 while illuminated with a light having a reference light characteristic (e.g., wavelength) as the reference image 604.

For any of the analysis techniques described herein, after determining the microstructure of the thermal barrier coating 114 of the work piece 120, the processor 103 may take one or more responsive or remedial acts. For example, the processor 103 may take a responsive or remedial act by generating a control signal that is communicated to one or more other devices. In an embodiment, if the thermal barrier coating 114 is determined to have the cauliflower microstructure 302 that is associated with a high or satisfactory coating quality, the processor 103 may allow the work piece 120 to continue to a subsequent manufacturing or assembly stage. Optionally, the processor 103 may generate a control signal that indicates and classifies the work piece 120 as having a high quality thermal barrier coating. The control signal may be communicated to a device that groups the work piece 120 with other work pieces determined to have the same microstructure (and therefore the same quality). For example, the control signal may be transmitted to a robotic arm that mechanically moves the work piece 120 to a pile or line of other work pieces that have coatings with the cauliflower microstructure 302.

If the thermal barrier coating 114 is determined to have the columnar microstructure 202 that is associated with a reduced or lower coating quality, the processor 103 may take different steps. For example, the processor 103 may prevent the work piece 120 from continuing to a subsequent manufacturing or assembly stage. Optionally, the processor 103 may generate a control signal that indicates and classifies the work piece 120 as having a reduced quality thermal barrier coating. The control signal may be communicated to a device that groups the work piece 120 with other work pieces determined to have the columnar microstructure 202 (and therefore the same quality). For example, the control signal may be transmitted to a robotic arm that mechanically moves the work piece 120 to a pile or line of other work pieces that have coatings with the columnar microstructure 202. Grouping multiple work pieces having the same quality thermal barrier coating enables assembly of these similar work pieces into a common machine. For example, the rotor blades of a turbine may all have the same quality of thermal barrier coating, so the blades are expected to reach the end of their operational lifespan at a common time window. At such time, the turbine may be disassembled and all of the blades discarded without prematurely discarding any blades that have significant lifespan remaining due to a higher quality thermal barrier coating on the blades.

The control signal may automatically schedule the work piece 120 for repair or additional inspection by an operator, such as to confirm the quality of the coating. For example, the control signal may cause the work piece 120 to be taken to another manufacturing stage in which the thermal barrier coating 114 is removed from the work piece 120 before re-applying the thermal barrier coating 114 to the work piece 120. In another alternative embodiment, the control signal may cause the work piece 120 to be discarded (e.g., trashed) or recycled without attempting to repair the coating. The control circuit 102 may generate a signal to notify an operator of the detected microstructure of the thermal barrier coating, such as via a text-based message, an audio message, or the like. The result of the inspection (e.g., the detected microstructure and associated quality of the coating) may be recorded in a report that is stored in the memory 106 or another storage device.

Optionally, the inspection system 100 described herein may be incorporated into a feedback loop of a manufacturing process that applies the thermal barrier coatings 114 on the work pieces 120. For example, if a sufficient number or percentage of the tested work pieces 120 are determined to have the lower quality thermal barrier coating 114 associated with the columnar microstructure 202, then this may indicate that a control parameter of the coating application process is off and should be modified. The processor 103 may generate a control signal configured to modify one or more control parameters of the coating application process. For example, the control signal may be communicated to a control device at the coating stage. Upon receiving the control signal, the control device may modify a temperature, a pressure, a humidity, a powder application rate, or the like, of the coating application process in an attempt to increase the number or percentage of thermal barrier coatings that have the higher quality cauliflower microstructure 302. The inspection system 100 disclosed herein may beneficially reduce the overall rate at which work pieces 120 are discarded by enabling kitting or grouping of work pieces 120 having similar coating qualities and by modifying the coating process based on the inspection to reduce the number of low quality coatings produced.

Figure 7:
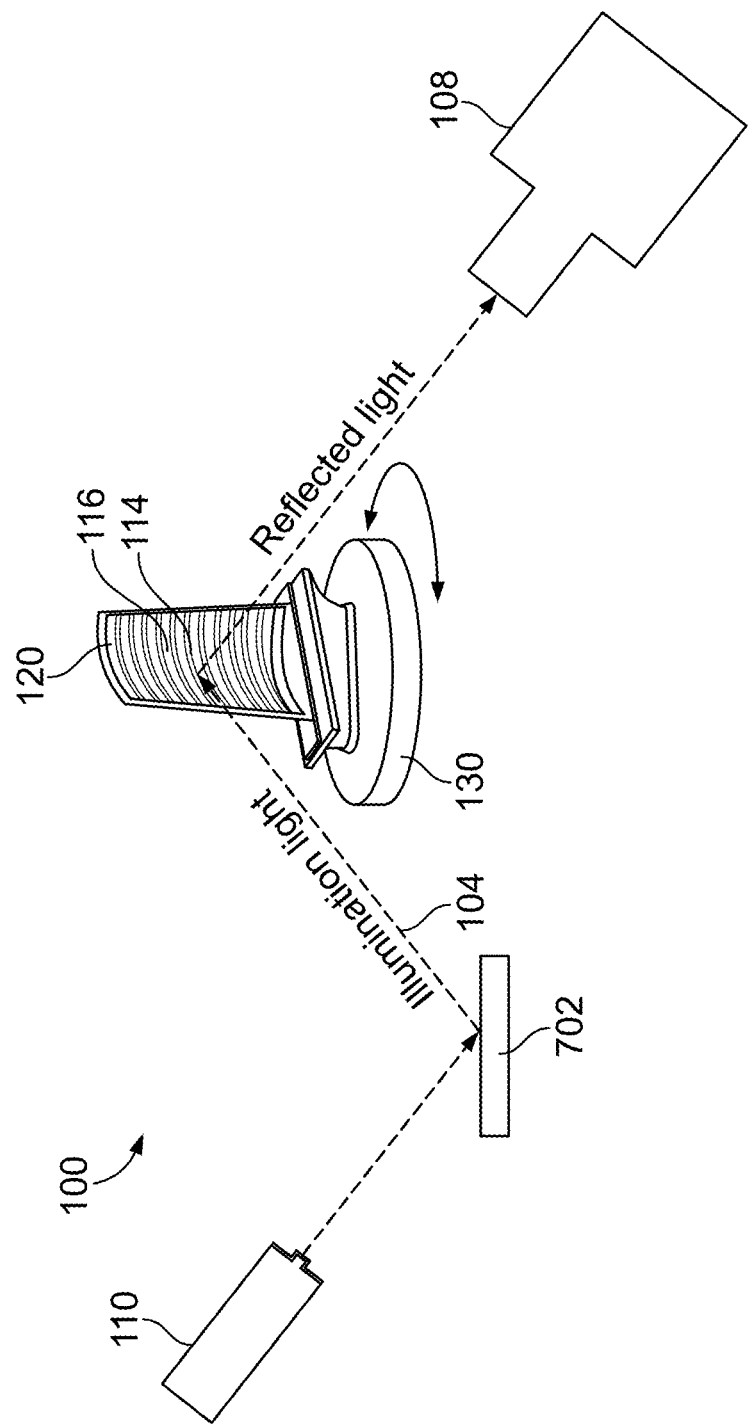
FIG. 7 is a block diagram of the inspection system according to another embodiment.

FIG. 7 is a block diagram of the inspection system 100 according to another embodiment. The inspection system 100 in FIG. 7 includes a digital mirror array 702 that directs the illumination light 104 towards the surface 116 of the work piece 120. The digital mirror array 702 may include multiple mirrors that are controllable by the control circuit 102 (shown in FIG. 1). The mirrors may be controlled to change the angle and intensity of the illumination light 104 on the surface 116. The digital mirror array 702 may be configured to provide a more uniform intensity of the illumination light 104 on the surface 116 than is provided by the light source 110 alone without the digital mirror array 702. The digital mirror array 702 may be a component of the light source 110.

The work pieces 120 that are inspected may have various curves and angles. In the illustrated embodiment, the base 130 that holds the work piece 120 is able to swivel to rotate the work piece 120 relative to the imaging device 108 and/or the light source 110 and digital mirror array 702. Optionally, the base 130 may also be able to tilt along another plane than the plane of the swivel. The control circuit 102 may control the base 130 to rotate and/or tilt the work piece 120 to compensate for the angle geometry complexities of the work piece 120 and ensure that the imaging device 108 receives a sufficient amount of reflected light. The control circuit 102 may be configured to synthesize image data of the surface 116 of the work piece 120 based on multiple images acquired by the imaging device 108 at different relative angles and/or positions of the work piece 120 due to the movement of the base 130.

Figure 8:
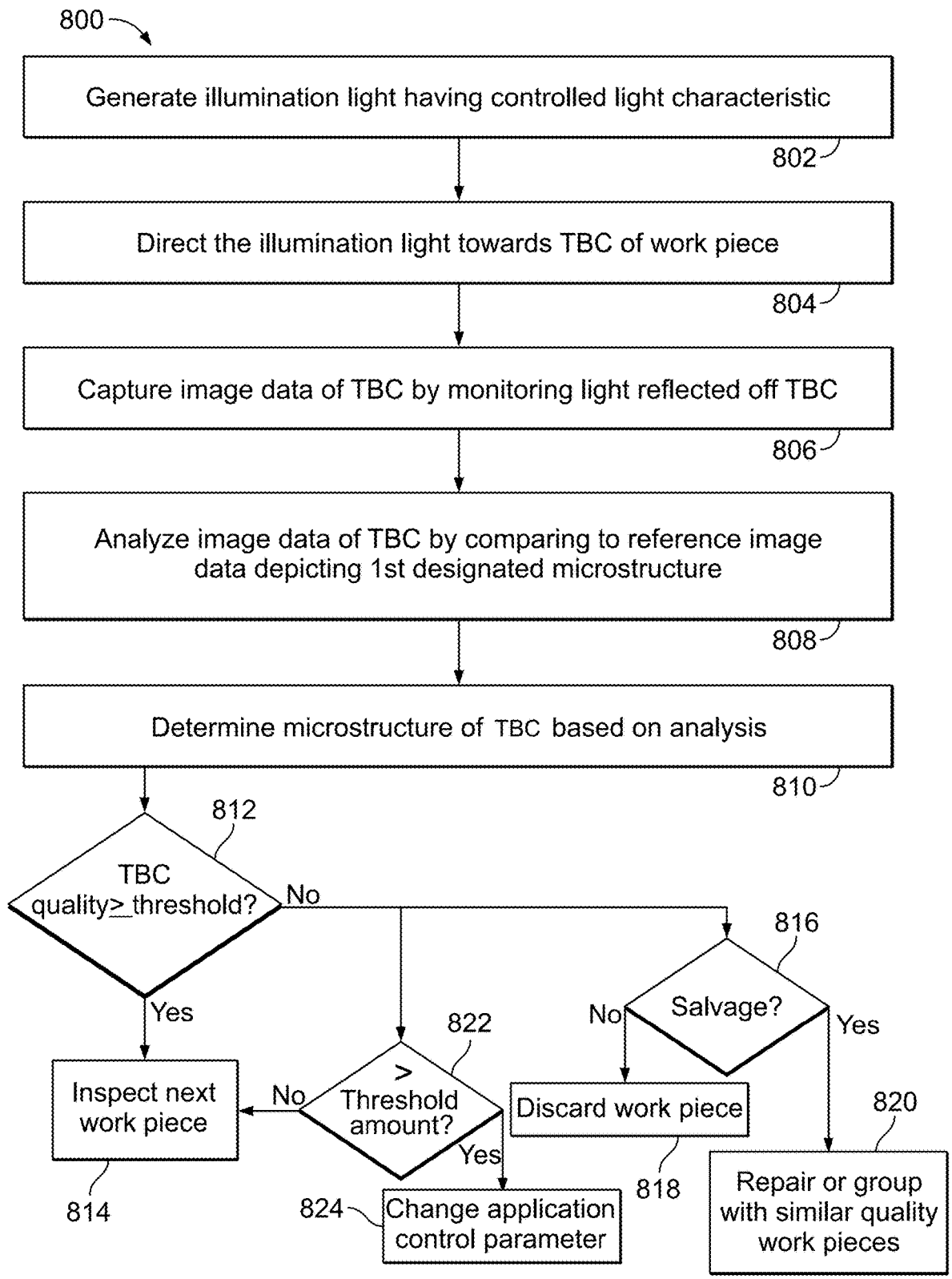
FIG. 8 is a flowchart of a method for inspecting a thermal barrier coating of a work piece according to an embodiment.

FIG. 8 is a flowchart of a method 800 for inspecting a thermal barrier coating of a work piece according to an embodiment. The method 800 may represent at least some of the operations performed by the control circuit 102, including the one or more processors 103 thereof, of the inspection system 100 shown in FIG. 1. The method 800 may represent an algorithm used to create (e.g., write) one or more software applications that direct operation of one or more processors 103 of the control circuit 102.

Referring to FIGS. 1 through 7, the method 800 begins at 802, at which an illumination light 104 is generated that has a controlled light characteristic. The illumination light 104 may be generated by the light source 110 under the control of the control circuit 102. The controlled light characteristic may be a specific wavelength or wavelength range of the illumination light 104. For example, the illumination light 104 may be IR light or may have a specific intensity.

At 804, the illumination light 104 is directed towards a thermal barrier coating ("TBC" in FIG. 8) 114 of a work piece 120. The illumination light 104 may be directed by the light source 110 and/or a digital mirror array 702. At 806, image data of the thermal barrier coating 114 is captured by monitoring the illumination light 104 that is reflected off the surface 116 of the thermal barrier coating 114. The image data may be captured by an imaging device 108, such as a camera.

At 808, the image data of the thermal barrier coating 114 is analyzed by comparing the image data to reference image data depicting a first designated microstructure. For example, the first designated microstructure may be a columnar microstructure 202 that is associated with a lower coating quality than a second designated microstructure referred to as a cauliflower microstructure 302. Optionally, the analysis may also include comparing the image data to additional reference image data depicting the second designated microstructure.

At 810, the microstructure of the thermal barrier coating 114 of the work piece 120 is determined. The thermal barrier coating 114 may be determined by the control circuit 102 to have the first or columnar microstructure 202 if the image data is within a designated threshold range of the reference image data associated with the columnar microstructure 202. In addition or as an alternative, the thermal barrier coating 114 may be determined by the control circuit 102 to have the first or columnar microstructure 202 if the image data more closely matches or corresponds to the reference image data associated with the columnar microstructure 202 than the additional reference image data that is associated with the cauliflower microstructure 302. The thermal barrier coating 114 may be determined by the control circuit 102 to have the second or cauliflower microstructure 302 if the image data is outside of the designated threshold range of the reference image data associated with the columnar microstructure 202 or is within a designated threshold range of the reference image data associated with the cauliflower microstructure 302. Alternatively, the thermal barrier coating 114 may be determined by the control circuit 102 to have the cauliflower microstructure 302 if the image data more closely matches or corresponds to the reference image data associated with the cauliflower microstructure 302 than the reference image data that is associated with the columnar microstructure 202.

At 812, a determination is made whether the quality of the thermal barrier coating 114 of the work piece 120 satisfies or exceeds a designated coating threshold. In an embodiment, thermal barrier coatings 114 that have the cauliflower microstructure 302 satisfy or exceed the quality threshold, and thermal barrier coatings 114 that have the columnar microstructure 202 do not satisfy or exceed the quality threshold. Therefore, if the microstructure of the thermal barrier coating 114 is determined at 810 to be the cauliflower microstructure 302, then the coating quality satisfies the threshold and the flow proceeds to 814. At 814, a next work piece 120 is inspected by the inspection system 100. If, on the other hand, the thermal barrier coating 114 is determined at 810 to have the columnar microstructure 202, then the coating quality does not satisfy the threshold and the flow proceeds to both 816 and 822.

At 816, it is determined whether the work piece 120 should be salvaged. If not, the work piece 120 is discarded at 818. If the work piece 120 is determined to be salvaged, then the flow continues to 820. At 820, the work piece 120 is either repaired or grouped with other work pieces 120 that have similar quality thermal barrier coatings 114. For example, the work piece 120 may be repaired by stripping the thermal barrier coating 114 and then re-applying a thermal barrier coating 114 to the work piece 120 via a coating application process. The work piece 120 may be grouped with similar quality work pieces 120 instead of repairing the work piece 120 to form a kit of similar quality work pieces 120 that can be installed together in a machine or component.

At 822, it is determined whether the amount of work pieces 120 having lower quality thermal barrier coatings 114 (e.g., the columnar microstructure 202) exceeds a threshold amount. The threshold amount may be a specified percentage of all thermal barrier coatings 114 inspected, such as 5% or 10%. Thus, if the threshold is 10% and 15% of the inspected work pieces 120 have the lower quality columnar microstructure 202, then the threshold is exceeded and the flow continues to 824. At 824, one or more coating application control parameters are changed in an attempt to reduce the number of thermal barrier coatings 114 produced with the columnar microstructure 202. For example, the temperature, pressure, humidity, powder flow rate, or the like may be modified. If the amount of lower quality coatings does not exceed the threshold, then it may not be worth it to modify the coating application process. Therefore, flow continues to 814 and the next work piece 120 is inspected.

At least one technical effect of one or more of the embodiments described herein is the ability to efficiently determine a quality of a thermal barrier coating on a work piece, such as a component of a gas turbine engine, without requiring a material sample of the thermal barrier coating or otherwise interfering with the integrity of the thermal barrier coating on the work piece because the determination is based on the reflective properties of the thermal barrier coating. Another technical effect of the embodiments described herein may be an overall improvement in the quality of thermal barrier coatings produced because the inspection system and method can be applied in real time to test every thermal barrier coating that is produced, and the quality determinations can be utilized in a feedback loop to modify the coating application process. For example, if a control parameter of the coating application process is out of range, which results in the formation of lower quality thermal barrier coatings, then the inspection system can detect such a trend after a small subset of thermal barrier coatings are applied. The control parameter may be modified to rectify the error and improve the coating application process before producing a multitude of lower quality thermal barrier coatings.

In addition to generally improving the coating application process by adjusting parameters to increase the number or percentage of high quality thermal barrier coatings produced, another technical effect of the embodiments described herein may include extending the operational lifespan of machinery using the work pieces having the thermal barrier coatings, such as rotor assemblies. For example, by determining the microstructure and/or quality of the thermal barrier coating on each of a multitude of work pieces, the work pieces may be grouped together based on commonality of the microstructure and/or quality. As a result, the rotor blades in a rotor assembly, for example, may all have a similar coating quality such that all of the blades have the same expected lifespan. No longer would the presence of a few lower coating quality rotor blades in a rotor assembly of mostly higher coating quality rotor blades reduce the lifespan of all of the blades. Another technical effect associated with grouping or kitting, is a general reduction in the number of work pieces that are discarded and/or repaired based on having a lower quality thermal barrier coating. For example, the work pieces determined to have lower quality coatings could be grouped together and utilized in an assembly or machine. The assembly or machine would likely require maintenance to replace the work pieces before a similar machine that has work pieces with higher quality coatings, but at least the lower coating quality work pieces can be utilized and no work pieces are replaced prematurely because all have the same expected lifespan.

In one or more embodiments of the present disclosure, an inspection system is provided that includes a light source, an imaging device, and one or more processors. The light source is configured to direct an illumination light having a controlled light characteristic towards a surface of a thermal barrier coating of a work piece. The imaging device is configured to capture image data of the surface of the thermal barrier coating by monitoring the illumination light reflected off the surface. The one or more processors are operably connected to the imaging device and configured to analyze the image data of the surface by comparing the image data to reference image data depicting a first designated microstructure. The first designated microstructure has an associated coating quality value. The one or more processors are configured to determine that the thermal barrier coating of the work piece has the first designated microstructure based on the analysis.

Optionally, the illumination light generated by the light source is infrared light, and the imaging device is an infrared camera.

Optionally, the one or more processors are configured to determine that the thermal barrier coating of the work piece has the first designated microstructure responsive to a light characteristic of the image data of the surface being within a designated threshold of the light characteristic of the reference image data.

Optionally, the coating quality value associated with the first designated microstructure is below a predefined quality threshold. Responsive to determining that the thermal barrier coating of the work piece has the first designated microstructure, the one or more processors are configured to generate a control signal configured to modify one or more coating control parameters of a thermal barrier coating application process.

Optionally, responsive to determining that the thermal barrier coating of the work piece has the first designated microstructure, the one or more processors are configured to generate a control signal configured to classify the work piece as having the first designated microstructure for grouping the work piece with other work pieces having the first designated microstructure.

Optionally, the one or more processors are configured to analyze the image data of the surface by calculating a ratio of the image data to the reference image data and comparing the ratio to a predefined threshold associated with the first designated microstructure.

Optionally, the one or more processors are configured to analyze the image data of the surface by generating a gradient image based on the image data and comparing a pattern in the gradient image to a pattern in the reference image data that depicts the first designated microstructure.

Optionally, the one or more processors are configured to control the light source to generate the illumination light having a selected wavelength range as the controlled light characteristic. The selected wavelength range is associated with the first designated microstructure. Optionally, the one or more processors are configured to control the light source to generate a light having a reference wavelength range and to control the imaging device to capture a work piece reference image while the work piece is illuminated with the light having the reference wavelength range. The one or more processors are configured to analyze the image data of the surface by calculating a ratio of the image data to the work piece reference image.

Optionally, the one or more processors are configured to compare the image data of the surface to additional reference image data depicting a different, second designated microstructure. The second designated microstructure has an associated coating quality value that is greater than the coating quality value associated with the first designated microstructure. Optionally, the one or more processors are configured to determine that the thermal barrier coating of the work piece has the first designated microstructure responsive to the image data of the surface more closely matching the reference image data that depicts the first designated microstructure than the additional reference image data that depicts the second designated microstructure.

In one or more embodiments of the present disclosure, a method for inspecting a thermal barrier coating of a work piece is provided. The method includes directing an illumination light having a controlled light characteristic towards a surface of the thermal barrier coating of the work piece. The method includes capturing image data of the surface of the thermal barrier coating by monitoring the illumination light reflected off the surface, and analyzing, via one or more processors, the image data of the surface by comparing the image data to reference image data depicting a first designated microstructure. The first designated microstructure has an associated coating quality value. The method also includes determining that the thermal barrier coating of the work piece has the first designated microstructure based on the analysis.

Optionally, the method also includes generating a control signal configured to classify the work piece as having the first designated microstructure for grouping the work piece with other work pieces having the first designated microstructure.

Optionally, the coating quality value associated with the first designated microstructure is below a predefined quality threshold. Responsive to determining that the thermal barrier coating of the work piece has the first designated microstructure, the method further includes generating a control signal configured to modify one or more coating control parameters of a thermal barrier coating application process.

Optionally, the analyzing (operation) further includes comparing the image data of the surface to additional reference image data depicting a different, second designated microstructure. The second designated microstructure has an associated coating quality value that is greater than the coating quality value associated with the first designated microstructure. Optionally, the thermal barrier coating of the work piece is determined to have the first designated microstructure responsive to the image data of the surface more closely matching the reference image data that depicts the first designated microstructure than the additional reference image data that depicts the second designated microstructure.

Optionally, the method also includes controlling a light source to generate infrared light as the illumination light that is directed towards the surface of the thermal barrier coating.

Optionally, the image data of the surface is analyzed by calculating a ratio of the image data to the reference image data and comparing the ratio to a predefined threshold associated with the first designated microstructure.

Optionally, the image data of the surface is also analyzed by calculating a second ratio of the image data to additional reference image data depicting a different, second designated microstructure, and comparing the second ratio to a predefined threshold associated with the second designated microstructure.

Optionally, the image data of the surface is analyzed by generating a gradient image based on the image data and comparing a pattern in the gradient image to a pattern in the reference image data that depicts the first designated microstructure.

Optionally, the method also includes controlling a light source to generate the illumination light having a selected wavelength range as the controlled light characteristic. The image data is analyzed by comparing an intensity of the image data, which is based on the reflected illumination light, to an intensity of the reference image data.

In one or more embodiments of the present disclosure, a method for inspecting a thermal barrier coating of a work piece is provided. The method includes capturing image data of a surface of the thermal barrier coating of the work piece by monitoring an illumination light reflected off the surface. The method includes analyzing, via one or more processors, the image data of the surface by comparing the image data to both first reference image data depicting a first designated microstructure and second reference image data depicting a second designated microstructure. The first and second designated microstructures have different respective coating quality values. The method also includes generating a control signal that classifies the thermal barrier coating of the work piece as having the first designated microstructure or the second designated microstructure based on the analysis. The control signal classifies the thermal barrier coating of the work piece as having the first designated microstructure responsive to the image data of the surface more closely matching the first reference image data than the second reference image data. The control signal classifies the thermal barrier coating as having the second designated microstructure responsive to the image data of the surface more closely matching the second reference image data than the first reference image data.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are example embodiments. Many other embodiments will be apparent to those of ordinary skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. An inspection system comprising:
a light source configured to direct an illumination light having a controlled light characteristic towards a surface of a thermal barrier coating of a work piece;
an imaging device configured to capture image data of the surface of the thermal barrier coating by monitoring the illumination light reflected off the surface; and
one or more processors operably connected to the imaging device and configured to analyze the image data of the surface by comparing the image data to reference image data depicting a first designated microstructure and to additional reference image data depicting a different, second designated microstructure, the first designated microstructure having an associated coating quality value, the second designated microstructure having an associated coating quality value that is greater than the coating quality value associated with the first designated microstructure, wherein the one or more processors are configured to determine that the thermal barrier coating of the work piece has the first designated microstructure or the second designated microstructure based on the analysis.

2. The inspection system of claim 1, wherein the illumination light generated by the light source is infrared light, and the imaging device is an infrared camera.

3. The inspection system of claim 1, wherein the one or more processors are configured to determine that the thermal barrier coating of the work piece has the first designated microstructure responsive to a light characteristic of the image data of the surface being within a designated threshold of the light characteristic of the reference image data.

4. The inspection system of claim 1, wherein the coating quality value associated with the first designated microstructure is below a predefined quality threshold and, responsive to determining that the thermal barrier coating of the work piece has the first designated microstructure, the one or more processors are configured to generate a control signal configured to modify one or more coating control parameters of a thermal barrier coating application process.

5. The inspection system of claim 1, wherein, responsive to determining that the thermal barrier coating of the work piece has the first designated microstructure, the one or more processors are configured to generate a control signal configured to classify the work piece as having the first designated microstructure for grouping the work piece with other work pieces having the first designated microstructure.

6. The inspection system of claim 1, wherein the one or more processors are configured to analyze the image data of the surface by calculating a ratio of the image data to the reference image data and comparing the ratio to a predefined threshold associated with the first designated microstructure.

7. The inspection system of claim 1, wherein the one or more processors are configured to analyze the image data of the surface by generating a gradient image based on the image data and comparing a pattern in the gradient image to a pattern in the reference image data that depicts the first designated microstructure.

8. The inspection system of claim 1, wherein the one or more processors are configured to control the light source to generate the illumination light having a selected wavelength range as the controlled light characteristic, the selected wavelength range associated with the first designated microstructure.

9. The inspection system of claim 8, wherein the one or more processors are configured to control the light source to generate a light having a reference wavelength range and to control the imaging device to capture a work piece reference image while the work piece is illuminated with the light having the reference wavelength range, and the one or more processors are configured to analyze the image data of the surface by calculating a ratio of the image data to the work piece reference image.

10. The inspection system of claim 1, wherein the one or more processors are configured to determine that the thermal barrier coating of the work piece has the first designated microstructure responsive to the image data of the surface more closely matching the reference image data that depicts the first designated microstructure than the additional reference image data that depicts the second designated microstructure.

11. A method for inspecting a thermal barrier coating of a work piece, the method comprising:
directing an illumination light having a controlled light characteristic towards a surface of the thermal barrier coating of the work piece;
capturing image data of the surface of the thermal barrier coating by monitoring the illumination light reflected off the surface;
analyzing, via one or more processors, the image data of the surface by comparing the image data to reference image data depicting a first designated microstructure and to additional reference image data depicting a different, second designated microstructure, the first designated microstructure having an associated coating quality value, the second designated microstructure having an associated coating quality value that is greater than the coating quality value associated with the first designated microstructure; and
determining that the thermal barrier coating of the work piece has the first designated microstructure or the second designated microstructure based on the analysis.

12. The method of claim 11, further comprising generating a control signal configured to classify the work piece as having the first designated microstructure for grouping the work piece with other work pieces having the first designated microstructure.

13. The method of claim 11, wherein the coating quality value associated with the first designated microstructure is below a predefined quality threshold and, responsive to determining that the thermal barrier coating of the work piece has the first designated microstructure, the method further comprises generating a control signal configured to modify one or more coating control parameters of a thermal barrier coating application process.

14. The method of claim 11, wherein the thermal barrier coating of the work piece is determined to have the first designated microstructure responsive to the image data of the surface more closely matching the reference image data that depicts the first designated microstructure than the additional reference image data that depicts the second designated microstructure.

15. The method of claim 11, wherein the image data of the surface is analyzed by calculating a ratio of the image data to the reference image data and comparing the ratio to a predefined threshold associated with the first designated microstructure.

16. The method of claim 15, wherein the image data of the surface is also analyzed by calculating a second ratio of the image data to the additional reference image data depicting the second designated microstructure, and comparing the second ratio to a predefined threshold associated with the second designated microstructure.

17. The method of claim 11, wherein the image data of the surface is analyzed by generating a gradient image based on the image data and comparing a pattern in the gradient image to a pattern in the reference image data that depicts the first designated microstructure.

18. The method of claim 11, further comprising controlling a light source to generate the illumination light having a selected wavelength range as the controlled light characteristic, wherein the image data is analyzed by comparing an intensity of the image data, which is based on the reflected illumination light, to an intensity of the reference image data.

19. A method for inspecting a thermal barrier coating of a work piece, the method comprising:
    directing an illumination light having a controlled light characteristic towards a surface of the thermal barrier coating of the work piece;
    capturing image data of the surface of the thermal barrier coating by monitoring the illumination light reflected off the surface;
    analyzing, via one or more processors, the image data of the surface by comparing the image data to reference image data depicting a first designated microstructure, the first designated microstructure having an associated coating quality value, wherein the image data of the surface is analyzed by (i) calculating a ratio of the image data to the reference image data and comparing the ratio to a predefined threshold associated with the first designated microstructure and by (ii) calculating a second ratio of the image data to the additional reference image data depicting a different, second designated microstructure and comparing the second ratio to a predefined threshold associated with the second designated microstructure; and
    determining that the thermal barrier coating of the work piece has the first designated microstructure based on the analysis.

20. A method for inspecting a thermal barrier coating of a work piece, the method comprising:
    capturing image data of a surface of the thermal barrier coating of the work piece by monitoring an illumination light reflected off the surface;
    analyzing, via one or more processors, the image data of the surface by comparing the image data to both first reference image data depicting a first designated microstructure and second reference image data depicting a second designated microstructure, wherein the first and second designated microstructures have different respective coating quality values; and
    generating a control signal that classifies the thermal barrier coating of the work piece as having the first designated microstructure or the second designated microstructure based on the analysis,
    wherein the control signal classifies the thermal barrier coating of the work piece as having the first designated microstructure responsive to the image data of the surface more closely matching the first reference image data than the second reference image data, and classifies the thermal barrier coating as having the second designated microstructure responsive to the image data of the surface more closely matching the second reference image data than the first reference image data.

21. The method of claim 20, wherein, responsive to determining that the thermal barrier coating of the work piece has the first designated microstructure, the method further comprises generating a control signal configured to modify one or more coating control parameters of a thermal barrier coating application process.

* * * * *